United States Patent [19]

Muhr et al.

[11] Patent Number: 4,903,985
[45] Date of Patent: Feb. 27, 1990

[54] WHEEL SUSPENSION

[75] Inventors: Karl-Heinz Muhr, Attendorn; Leo Schnaubelt, Haiger, both of Fed. Rep. of Germany

[73] Assignee: Muhr Und Bender, Attendorn, Fed. Rep. of Germany

[21] Appl. No.: 255,581

[22] Filed: Oct. 11, 1988

[30] Foreign Application Priority Data

Dec. 8, 1987 [DE] Fed. Rep. of Germany ....... 3741551
Dec. 22, 1987 [DE] Fed. Rep. of Germany ....... 3743450

[51] Int. Cl.⁴ .............................................. B60G 15/00
[52] U.S. Cl. ..................................... 280/724; 267/180
[58] Field of Search ............... 280/711, 688, 702, 712, 280/696, 724; 267/180

[56] References Cited

U.S. PATENT DOCUMENTS

| | | | |
|---|---|---|---|
| 2,576,824 | 11/1951 | Bush | 280/724 |
| 2,992,015 | 7/1961 | Halford et al. | 280/696 |
| 3,205,468 | 9/1965 | Henschen | 267/180 |
| 3,966,222 | 6/1976 | Felburn | 280/724 |

FOREIGN PATENT DOCUMENTS 1505616 11/1971 Fed. Rep. of Germany .
3743450 7/1989 Fed. Rep. of Germany .

Primary Examiner—Richard A. Bertsch
Attorney, Agent, or Firm—Browdy and Neimark

[57] ABSTRACT

A wheel suspension having a helical spring leg and transverse control with a shock absorber located inside of the spring arm is shown and described. The spring when in its unloaded state has an "S" shaped center line and may be curved in more than one plane. The center line of the spring when relaxed is not of a constant radius.

13 Claims, 8 Drawing Sheets

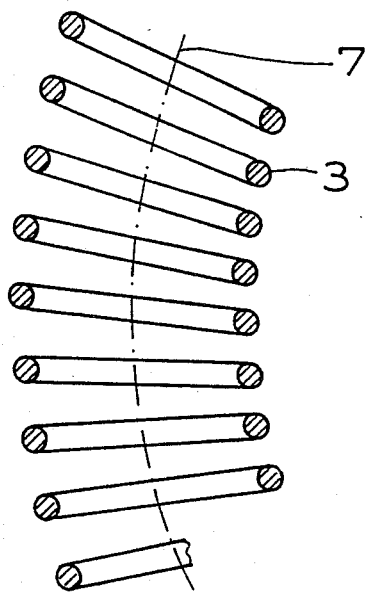
Fig.5
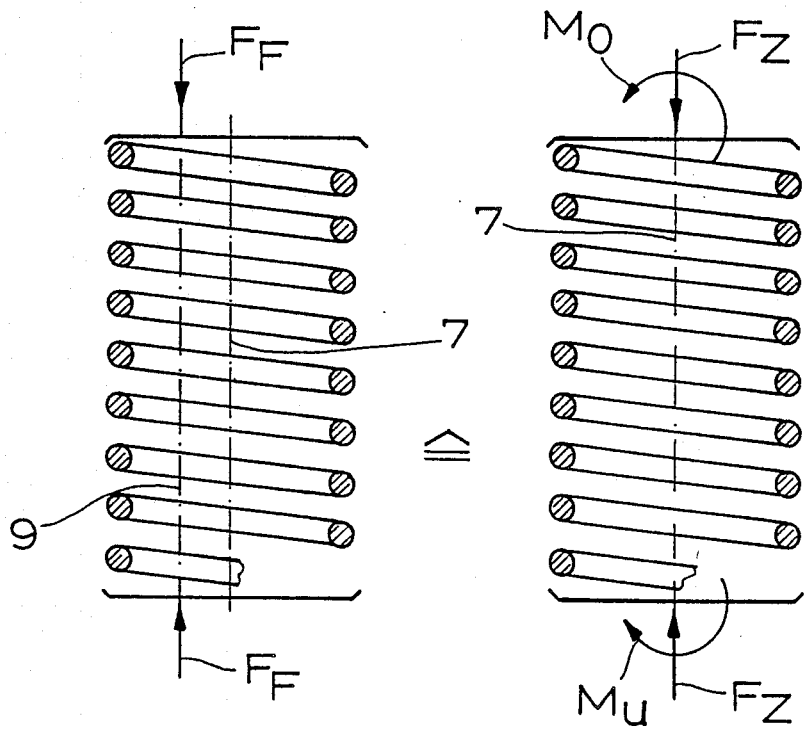

WHEEL SUSPENSION

FIELD OF THE INVENTION

The invention relates to a wheel suspension having a spring leg and having a transverse control arm. The spring leg is connected to the body on one end and to the wheel on the other and has a helical compression spring (i.e., support spring) and a shock absorber. The invention also relates to a helical compression spring, in particular for a wheel suspension of the above-described type.

BACKGROUND OF THE INVENTION

In wheel suspensions of the above-described type, often known as McPherson struts, the upper transverse control arm present in otherwise conventional wheel suspension is replaced by a long-stroke spring leg (see Lueger, "Lexikon der Technik" [Lexicon of Technology], Vol. 12, "Lexikon der Fahrzeugtechnik" [Lexicon of Automotive Engineering], 1967, Deutsche VerlagsAnstalt GmbH, Stuttgart, page 425).

Helical compression springs are always embodied in such a way that the spring center line is a straight line; any deviations from this are unintentional and dictated by manufacturing processes, but are tolerated within standard limits (see DIN 2096, part 2, paragraph 8). The line of spring force action coincides with the spring center line.

In wheel suspensions of the type that is the point of departure for the invention, the helical compression spring can be disposed initially concentric with the shock absorber axis. Then the entire shear force at the upper support point, that is, occurring at the body, must be absorbed by the piston rod of the shock absorber. This generates considerable frictional forces at the piston of the shock absorber, so that spring compression and relaxation is jerky.

To reduce the shear forced acting upon the shock absorber piston rod, the helical compression spring has for a long time been built into the spring leg in such a way that the line of spring force action forms an acute angle with the shock absorber axis. In the ideal case, the angle between the line of spring force action of the helical compression spring and the shock absorber axis would have to correspond to the angle between the line of supporting action and the shock absorber axis. Then in the normally loaded state, the piston rod of the shock absorber would be largely free of shear forces. Only upon compression or deflection—away from the static position of equilibrium, equal to the normally loaded state—would shear forces arise. In general, however, the angle between the line of spring force action of the helical compression spring and the shock absorber axis can be made only smaller than the angle between the line of support action and the shock absorber axis, because the smooth passage of the shock absorber through the helical compression spring and sufficient freedom of motion of the wheel must still be assured.

Because tires are becoming wider and wider, hence shifting the wheel-to-road contact point outward, larger and larger angles between the line of support action and the shock absorber axis arise, to which the line of spring force action must be adjusted, if the piston rod of the shock absorber is to be free of shear forces in the normally loaded state.

Since for the above reasons the helical compression spring cannot be positioned as obliquely with respect to the shock absorber axis as would actually be desired, the line of spring force action in the prior art has already been shifted with respect to the spring center line, by placing one or both end windings obliquely, by thickening the end windings, by placing the spring plate obliquely, or by a combination of these provisions. This makes it possible, within limits, to locate the spring force action line farther outward than the spring center line at the lower end of the helical compression spring, while at the upper end of the helical compression spring the line of spring force action and the spring center line pass through the support points. However, it is still unsatisfactory that the attainable angle between the line of spring force action and the shock absorber axis is still inadequate, and that the helical compression spring, in the medium operating range, in compression and relaxation, tends to have its windings contacting one another and tends to bulge outward.

SUMMARY OF THE INVENTION

The object of the present invention is to make a further contribution to solving the above-discussed problems, namely to disclose a wheel suspension, or a helical compression spring suitable for such a wheel suspension, in which or with which shear forces occurring at the piston rod of the shock absorber are or can be still more extensively eliminated.

The wheel suspension according to the invention in which the above-stated object is attained, is initially and substantially characterized in that the helical compression spring, in the unloaded state, has an "S" curved spring center line. The spring center line may be curved in only one plane or in more than one plane.

The teaching of the invention—the "S" curved spring center line—makes it possible, especially in combination with a suitable embodiment of one or both end windings and/or a suitable embodiment of the spring plate serving to introduce the force, to introduce shear forces or moments that result in reduced shear forces on the shock absorber, while the configuration of the spring leg and transverse control arm are otherwise unchanged. As initially explained above, the invention also relates to a helical compression spring, in particular for a wheel suspension of the basic type described at the outset. According to the invention, this helical compression spring is characterized in that in the unloaded state it has a "S" curved spring center line.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention will now be described in greater detail in terms of a single exemplary embodiment shown in the drawings, in which:

FIGS. 1B and 1C illustrate the shear force that arises;

DESCRIPTION OF THE PREFERRED EMBODIMENTS

Figure 1:
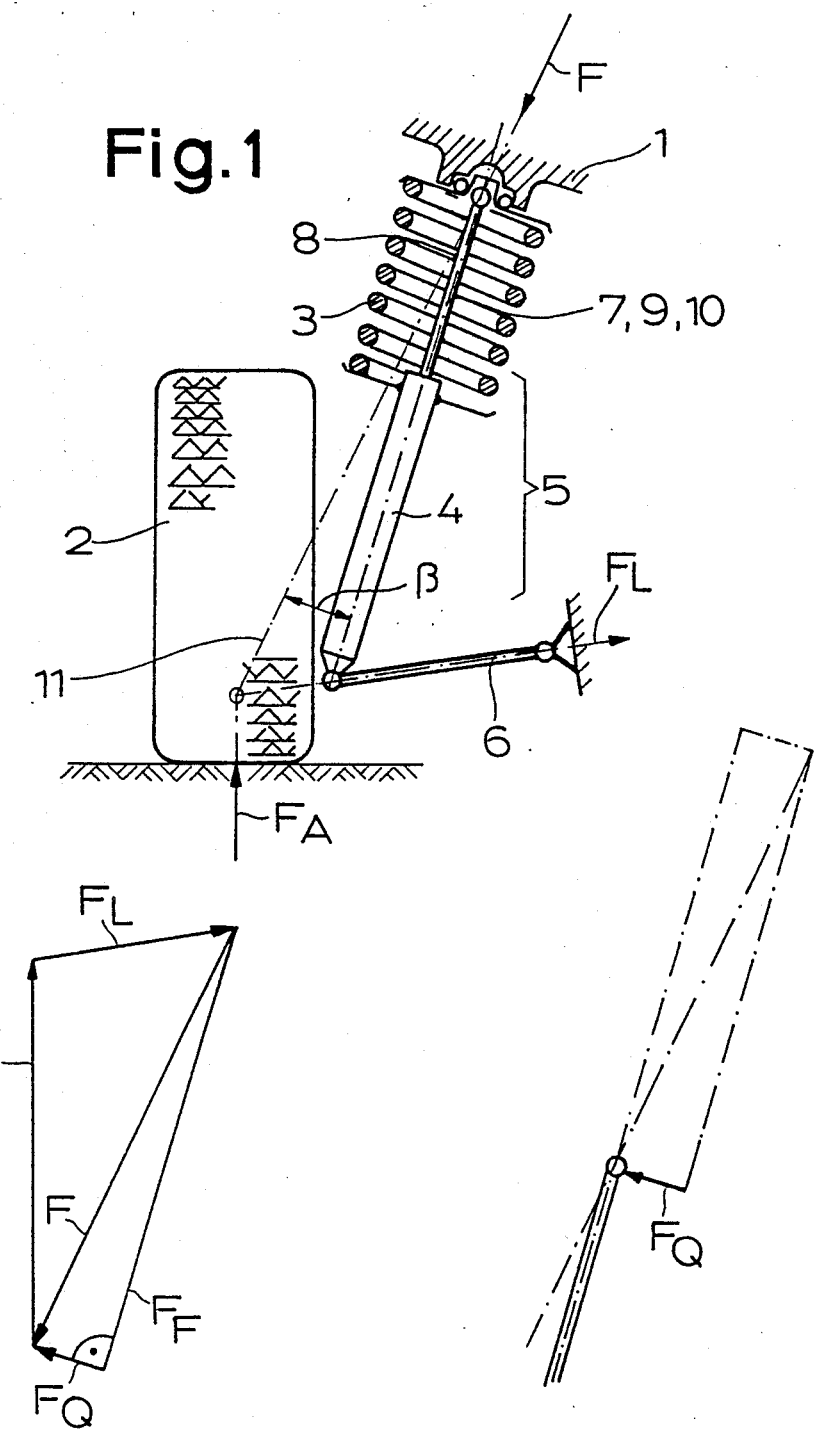
FIG. 1 graphically illustrates a wheel suspension of the type discussed in the present invention.
Figure 2:
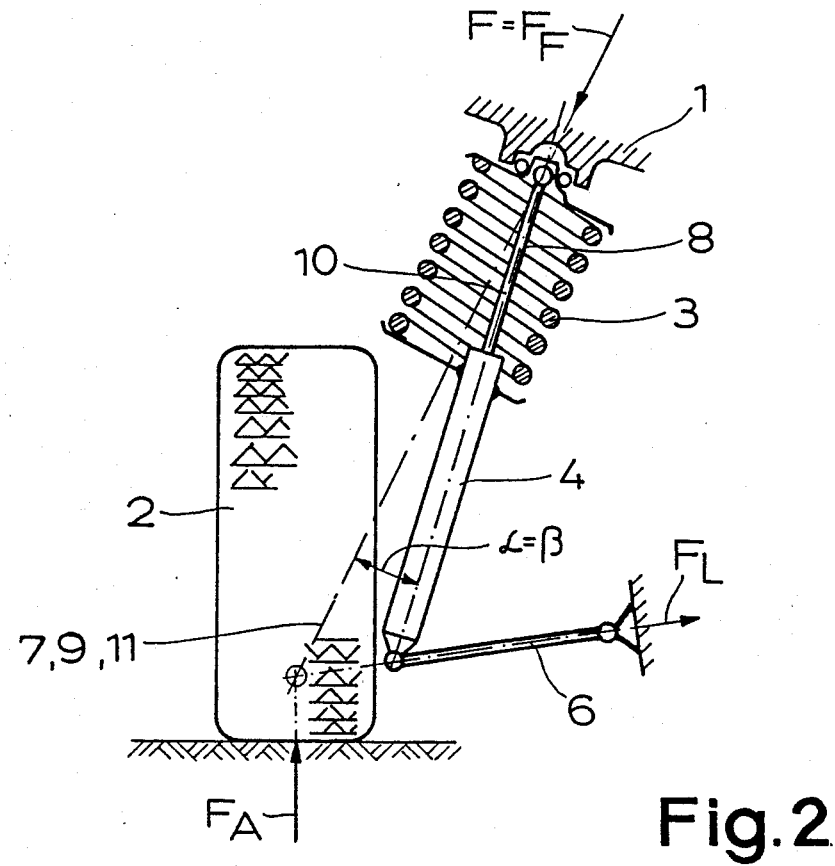
FIG. 2A is a view corresponding to FIG. 1 of a somewhat idealized wheel suspension, that is, one which is free of shear forces.
FIG. 2B illustrates the force lines showing no shear force.
Figure 2:
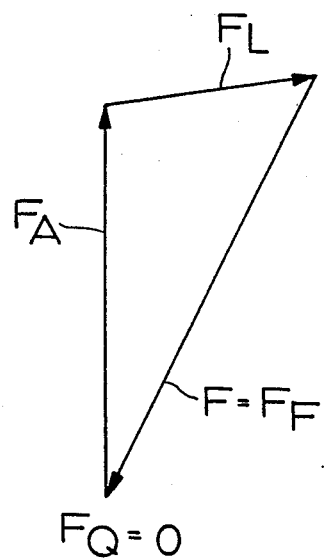
Figure 3:
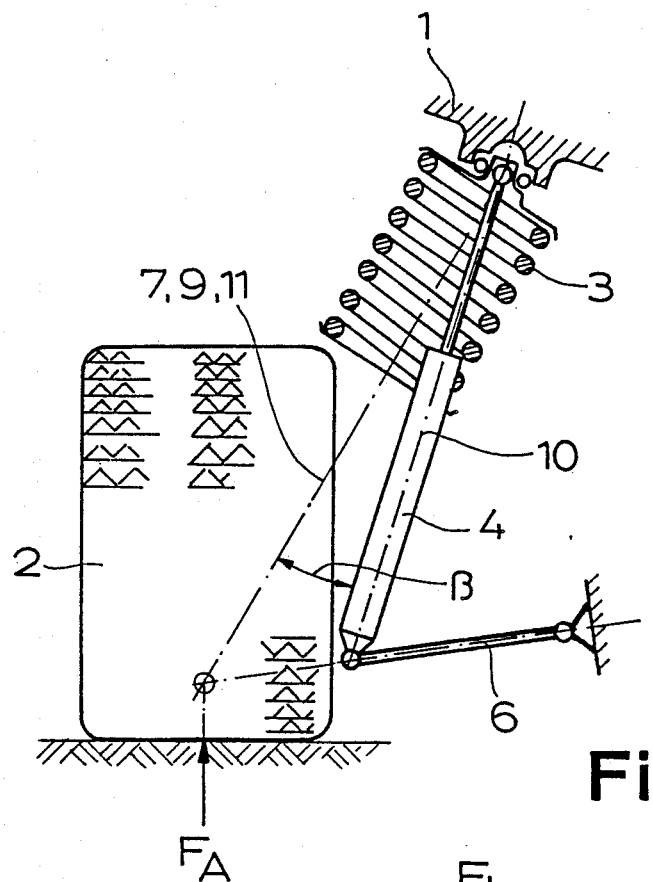
FIG. 3A is a view corresponding to FIG. 2A with an obliquely positioned helical compression spring, with the conditions prevailing when there is a particularly wide tire additionally being shown.
FIG. 3B shows the force lines of FIG. 3A.
Figure 3:
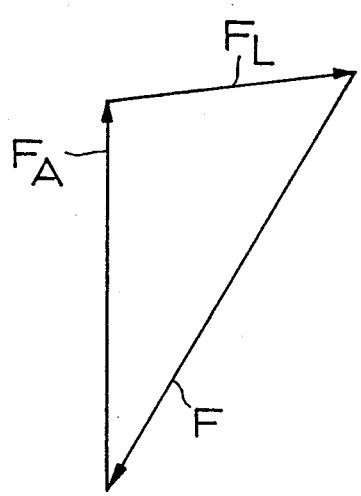
Figure 4:
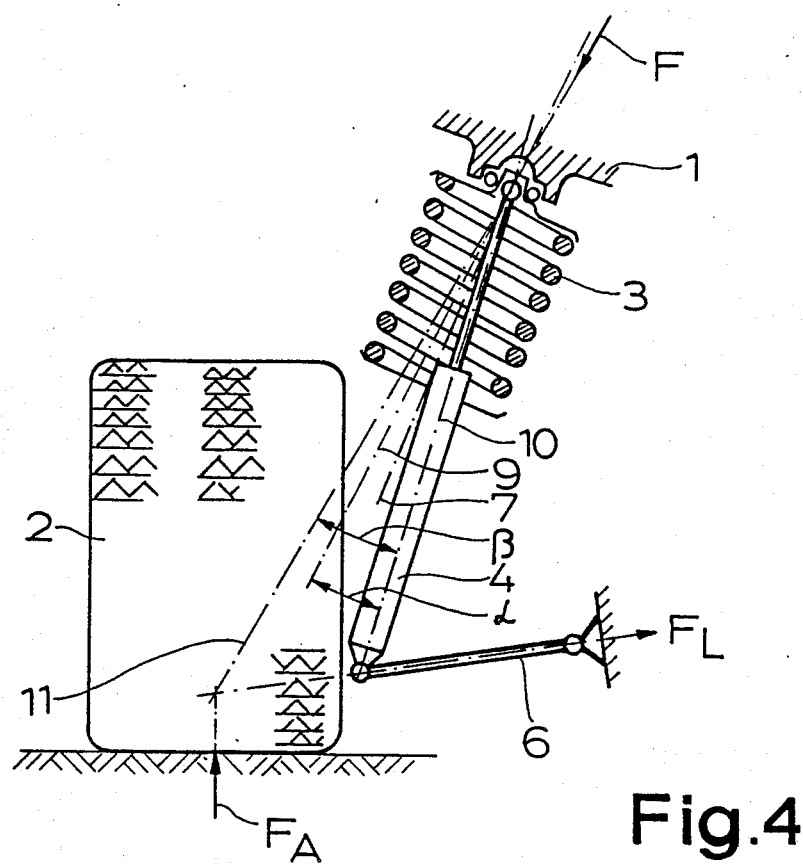
FIG. 4A is a view corresponding to FIG. 3A—that is, with espcially wide tires—having a helical compression spring with obliquely positioned end windings.
FIG. 4B shows the force lines of FIG. 4A.
Figure 4:
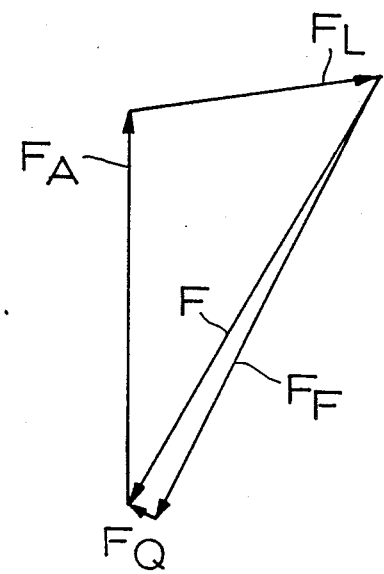

The wheel suspension shown in FIGS. 1-4 includes both a spring leg 5, which is connected at one end to the body 1 and to the other at the wheel 2 and has a helical compression spring 3 and a shock absorber 4, and a transverse control arm 6.

As FIGS. 1A, 1B and 1C show, a force equilibrium is established between different forces, namely between the tire contact force $F_A$, the transverse control arm force $F_L$, the body support force F, the helical compression spring force $F_F$, and the shear force $F_Q$. The undesirable shear force $F_Q$ to be absorbed by the piston rod 8 of the shock absorber 4 and leading to frictional forces at the piston of the shock absorber is the result of the fact that the angle $\alpha$ between the line 9 of spring force action of the helical compression spring 3 and the shock absorber axis 10, on the one hand, and the angle $\beta$ between the support action line 11 and the shock absorber axis 10 on the other are not the same, or in other words, the line 9 of spring force action and the line 11 of support action do not coincide.

In the wheel suspension shown in FIGS. 2A and 2B, which like the wheel suspension shown in FIG. 1 is prior art, the angle $\alpha$ between the line 9 of spring force action of the helical compression spring 3 and the shock absorber axis 10 on the one hand and the angle $\beta$ between the line of support action 11 and the shock absorber axis 10 on the other are the same; that is, the line of spring force action 9 and the line of support action 11 coincide. As a result, the helical compression spring force $F_F$ and the body support force F are equal, and so the shear force $F_Q$ is zero.

FIGS. 3A, 3B and 4A, 4B illustrate the situation of a wheel suspension for a wheel 2 having a particularly wide tire. If the helical compression spring 3 were positioned as highly obliquely as shown in FIG. 3A, such that the spring force action line 9 and the support action line 11 would coicide so that no shear force $F_Q$ would arise, then the smooth passage of the shock absorber 4 through the helical compression spring 3 and sufficient freedom of motion of the wheel 2 would not be assured. Moreover, in the middle operating range upon compression and relaxation, the helical compression spring 3 would tend to have windings in contact with one another and to bulge outward. Therefore only the conditions shown in FIG. 4A are realizable, in which the angle $\alpha$ between the spring force action line 9 and the shock absorber axis 10 on the one hand and the angle $\beta$ between the support action line 10 and the shock absorber axis 10 on the other are not the same; in other words, the spring force action line 9 and the support action line 11 do not coincide. Accordingly, an undesirable shear force $F_Q$ remains.

FIGS. 5 and 6, 6A, 6B now show exemplary embodiments of helical compression springs 3 according to the invention for wheel suspensions according to the invention. In the unloaded state, shown in FIG. 6A, the spring center line 7 is curved. The helical compression springs 3 shown may show a spring center line 7 that is S curved in only one plane, they may, however, even show a spring center line 7 that is curved in more than one plane. Those two possibilities are indicated in FIG. by way of the side view of the spring center line 7 in the direction indicated by the arrow X. In the embodiment identified as FIG. 6A-b the spring center line 7 is curved in only one plane so that in the view X it is seen to be not curved at all. In contrast in the embodiment indicated as FIG. 6A-b the spring center line 7 of the helical compression spring 3 is curved in two planes, i.e. in the plane seen at the left of this figure and, additionally, in the plane that extends perpendicular thereto and is to be seen as side view X in FIG. 6A-b. Therefore FIG. 5A-b) shows the spring center line 7 curved as well.

By means of the teaching of the S invention—that is, the curved spring center line 7—shear forces $F_X$, $F_Y$ or moments $M_O$, $M_U$ are induced, which cause the spring force action line 9 not to coincide with the spring center line 7. As a result, with an otherwise identical configuration of the spring leg 5 and transverse control arm 6, reduced shear forces $F_Q$ arise, or shear forces $F_Q$ can be prevented.

In the prior art embodiment of FIG. 5, the radius of curvature of the spring center line 7 is constant. This causes a parallel shift between the spring force and the action line 9 and the spring center line 7. Contrarily, in the exemplary embodiment of FIG. 6, the radius of curvature of the spring center line 7 is S shaped. This causes the spring force action line 9 to extend at an acute angle to the spring center line 7.

Figure 5A:
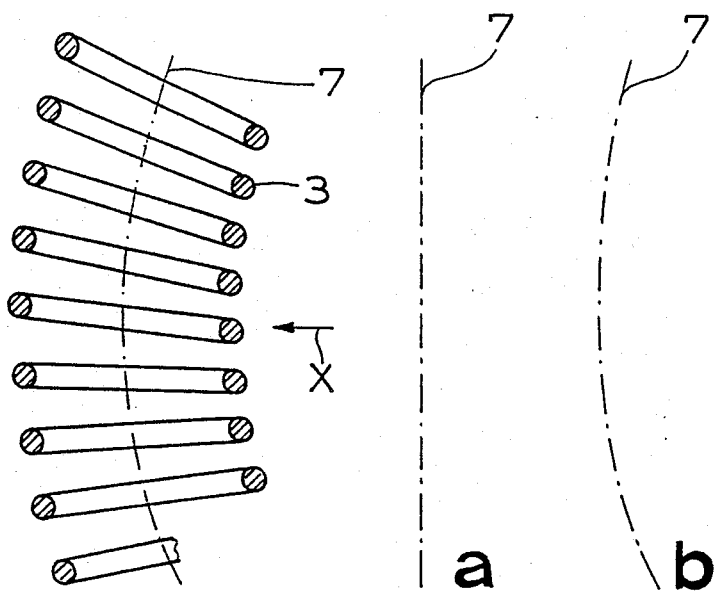
FIGS. 5A and 5B show a first exemplary embodiment of a curved center line helical compression spring as shown in the prior art.
Figure 5B:
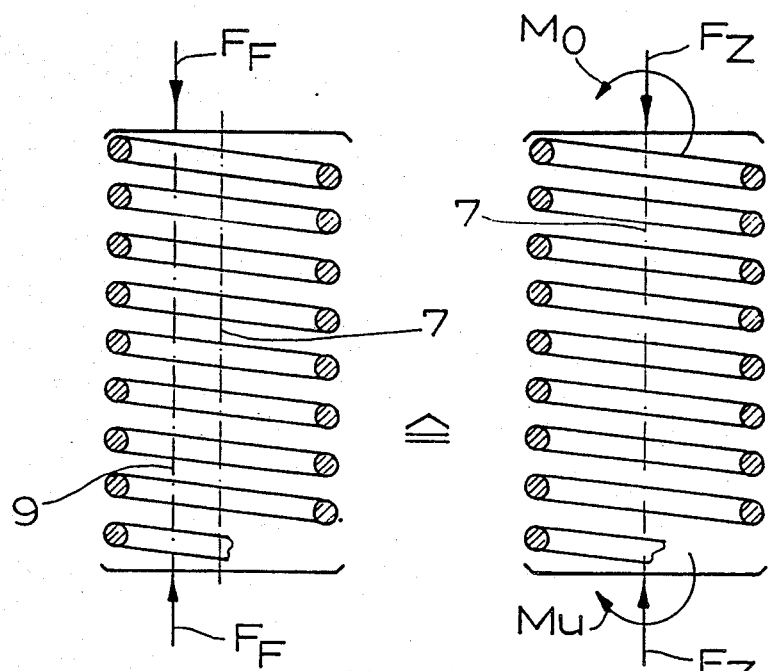
Figure 6:
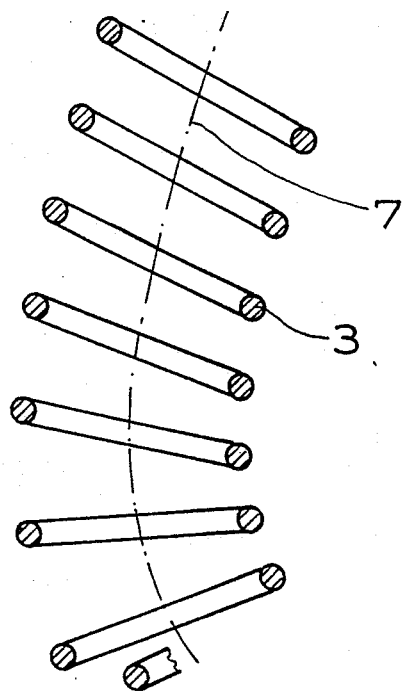
FIGS. 6A and 6B show an embodiment of a helical compression spring according to the invention, for a wheel suspension according to the invention.
Figure 6:
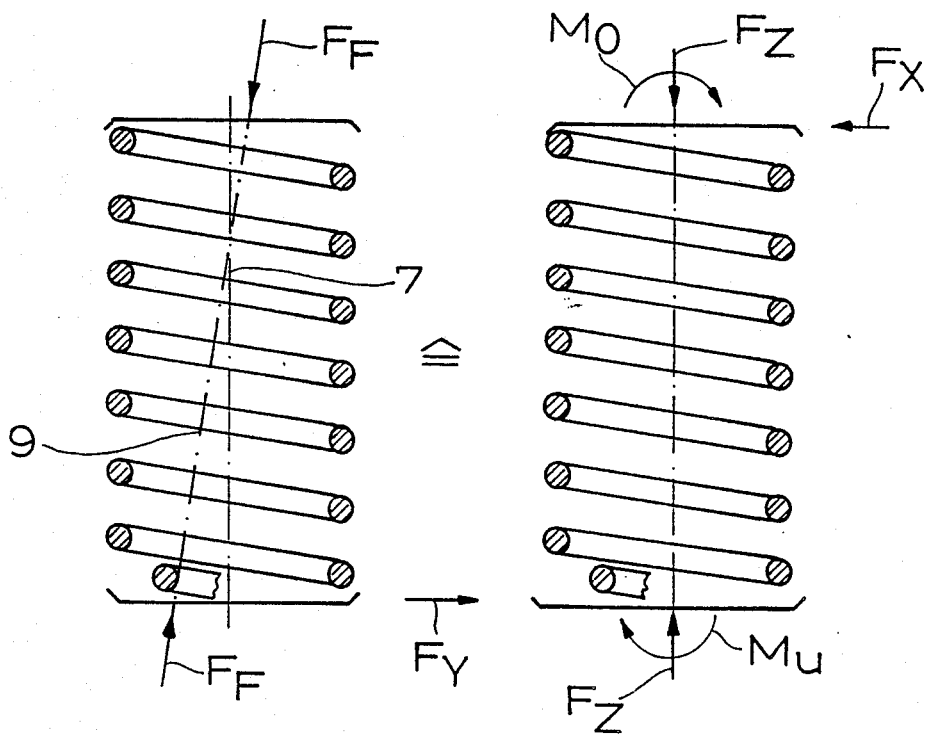
Figure 6A:
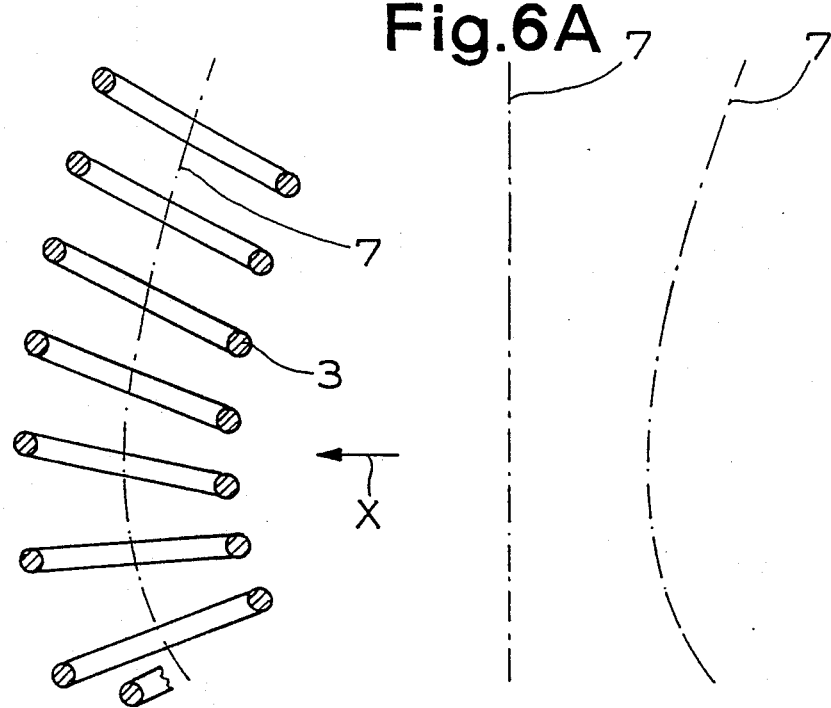
Figure 6B:
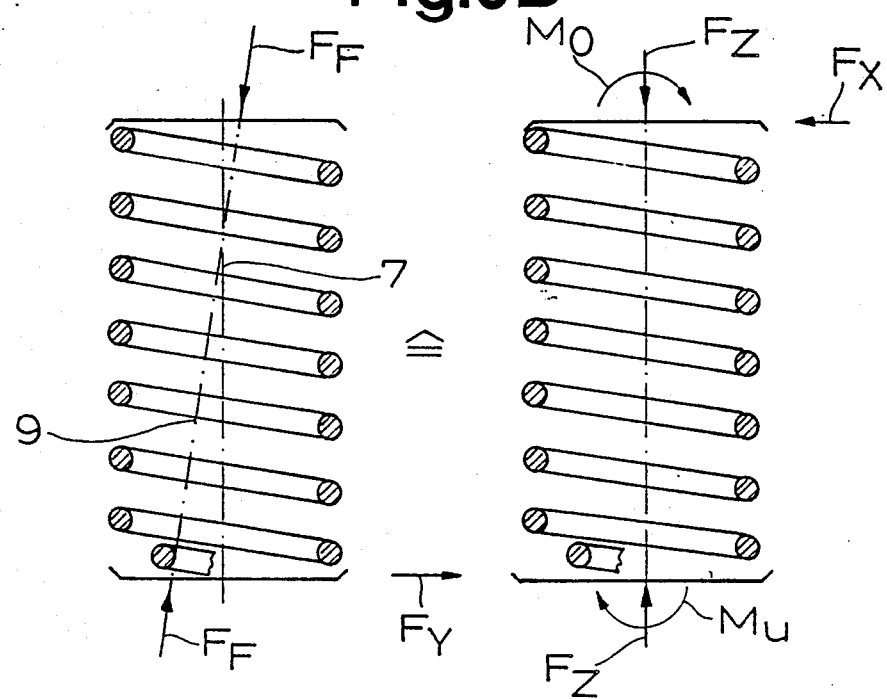

While the helical compression spring 3 according to the invention is shown in the unloaded state in the upper portions of FIG. 6, FIGS. 5B and 6B shows the loaded state, specifically the normally loaded state, or in other words the starting point for the middle operating range. The helical compression springs 3 are accordingly dimensioned overall in such a way that in the loaded state, or in the middle operating range, they have an at least approximately cylindrical shape. In particular, the dimensions are selected such that the helical compression spring 3 does not have any windings in contact with one another upon compression and relaxation over the entire operating range and does not tend to bulge outward impermissibly. The spring force action line 9 with the helical compression spring force $F_F$ shown in FIG. 6B on the lift results from the central force $F_Z$ and the moments $M_O$ and $M_U$, or from the central force $F_Z$, the shear forces $F_X$ and $F_Y$ and the moments $M_O$ and $M_U$.

What is claimed is:

1. A wheel suspension comprising a spring leg, which is connected to the body on the one end and the wheel on the other and having a helical compression spring, a shock absorber, and a transverse control arm, wherein in an unloaded state the spring center line of said helical compression spring has an approximately S-shaped course.

2. A wheel suspension as defined by claim 1, wherein said spring center line is curved in only one plane.

3. A wheel suspension as defined by claim 1, wherein said spring center line is curved in more than one plane.

4. A wheel suspension as defined by claim 1, wherein in a loaded state, preferably in the middle working range, the helical compression spring is approximately cylindrical in shape.

5. A wheel suspension as defined by claim 1, wherein over the entire operating range, the helical compression spring has no points of contact among the windings upon compression and relaxation.

6. A wheel suspension as defined by claim 1, wherein over the entire operating range, said helical compression spring does not tend to outward bulging upon compression and relaxation.

7. A helical compression spring, in particular for a wheel suspension having a spring leg, which is connected at one end to the vehicle body and the other to said wheel and has the helical compression spring and a shock absorber, and having a transverse control arm, wherein in an unloaded state, said has spring and S-shaped curved spring center line.

8. A helical compression spring as defined by claim 10, wherein said spring center line is curved in only one plane.

9. A helical compression spring as defined claim 7, wherein the spring center line is curved in more than one plane.

10. A helical compression spring as defined by claim 7, wherein the radius of curvature of the spring center line is not constant, preferably being variable from one point to another.

11. A helical compression spring as defined by claim 7, wherein in a loaded state, preferably in the medium working range, the helical compression spring is approximately cylindrical in shape.

12. A helical compression spring as defined by claim 7, wherein over the entire operating range, the helical compression spring has no points of contact among the windings upon compression and relaxation.

13. A helical compression spring as defined by claim 7, wherein over the entire operating range, the helical compression spring does not tend to outward bulging upon compression and relaxation.

* * * * *